United States Patent [19]
Gibler

[11] Patent Number: 5,984,141
[45] Date of Patent: Nov. 16, 1999

[54] BEVERAGE STORAGE AND MIXING DEVICE

[76] Inventor: Gregory A. Gibler, 1301 W. 24th St., Lawrence, Kans. 66046

[21] Appl. No.: 09/082,091

[22] Filed: May 20, 1998

[51] Int. Cl.$^6$ .............................. B65D 25/08; B67D 5/00
[52] U.S. Cl. ............................ 222/80; 206/219; 206/222; 215/DIG. 8; 222/129; 426/115; 426/120
[58] Field of Search ................................ 222/80, 81, 129, 222/144.5, 145.1; 426/115, 120, 85, 135; 206/219, 222; 215/6, DIG. 8

[56] References Cited

U.S. PATENT DOCUMENTS

| | | | |
|---|---|---|---|
| 3,521,745 | 7/1970 | Schwartzman | 206/222 |
| 3,869,555 | 3/1975 | Heonis | 426/134 |
| 4,102,451 | 7/1978 | Clarke et al. | 206/219 |
| 4,387,809 | 6/1983 | Botzler | 222/129 X |
| 4,823,946 | 4/1989 | Stoeffler et al. | 215/DIG. 8 X |
| 4,853,234 | 8/1989 | Bentley et al. | 426/77 |
| 4,891,232 | 1/1990 | Dahl | 426/78 |
| 4,921,713 | 5/1990 | Fowler | 426/85 |
| 4,996,066 | 2/1991 | Love et al. | 426/77 |
| 5,085,330 | 2/1992 | Paulin | 215/6 |
| 5,125,534 | 6/1992 | Rose et al. | 222/129 X |
| 5,215,214 | 6/1993 | Lev et al. | 222/129 |
| 5,603,432 | 2/1997 | Sardynski et al. | 222/129.1 |
| 5,772,017 | 6/1998 | Kang | 426/120 X |

Primary Examiner—Kevin P. Shaver
Attorney, Agent, or Firm—Chase & Yakimo, L.C.

[57] ABSTRACT

A beverage device is provided for separately storing two beverages and for selectively dispensing the beverages sequentially or in combination. The beverage device includes a cap assembly attached to a conventional drink bottle, the cap assembly having an inner cylindrical housing rotatably nested within an outer cylindrical housing. The housings are generally hollow and present apertures which facilitate the dispensing or mixing of beverages when properly aligned. The inner housing includes a channel which allows a drink to be drawn through a spout from the bottle by a user upon alignment of apertures between the housings. The inner housing further includes a chamber for storing a beverage until apertures in the inner and outer housings are aligned to release the beverage into the bottle for mixing and dispensing. Alignment of appropriate housing apertures is accomplished by rotation of the inner housing within the outer housing. Rotation of the inner housing also causes the bottom wall of the outer housing to rupture, thus releasing the beverage stored in the inner housing into the bottle for mixing and dispensing. Concurrent alignment of appropriate apertures and rupture of the bottom wall facilitate efficient circulatory mixing of beverage substances. Alternative structures for puncturing the bottom wall of the outer housing or for allowing a fluid flow through the inner and outer housings is disclosed.

20 Claims, 14 Drawing Sheets

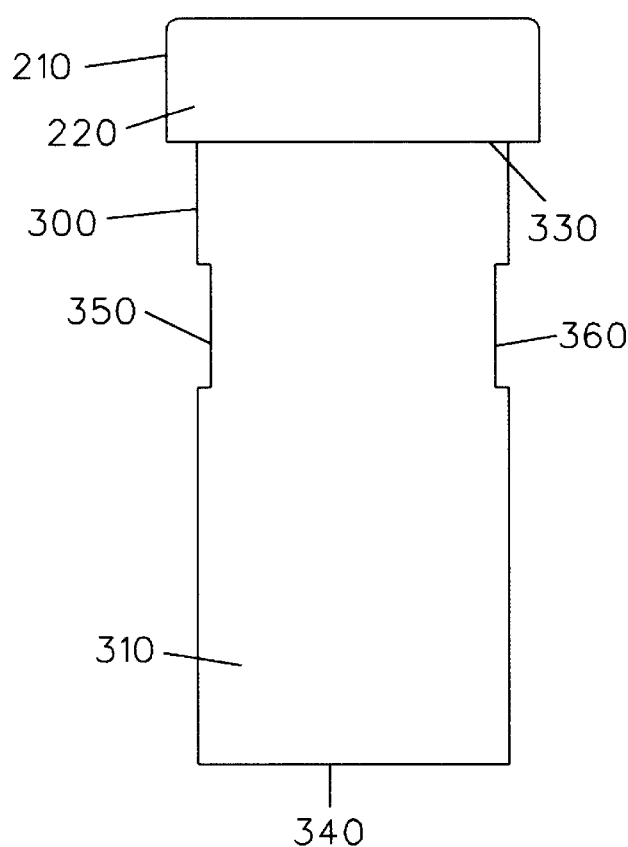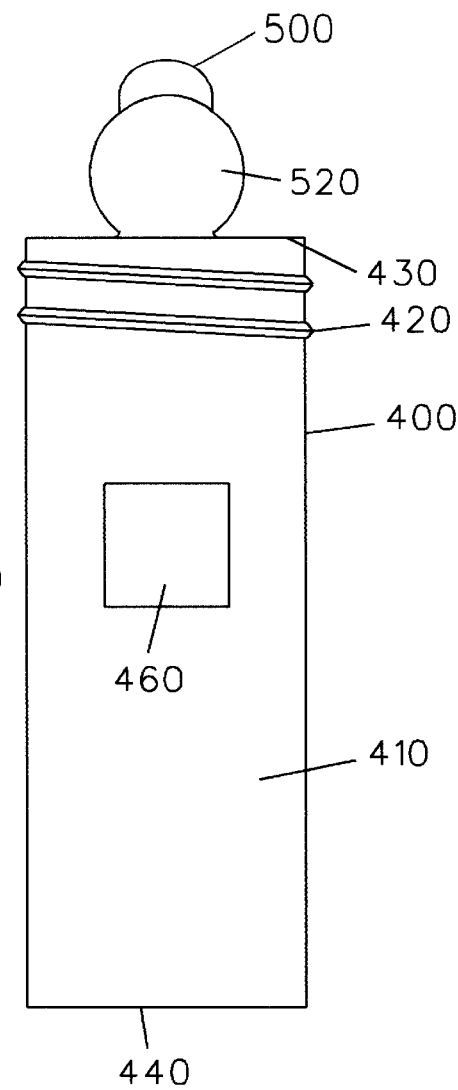
FIG. 9A
FIG. 9B

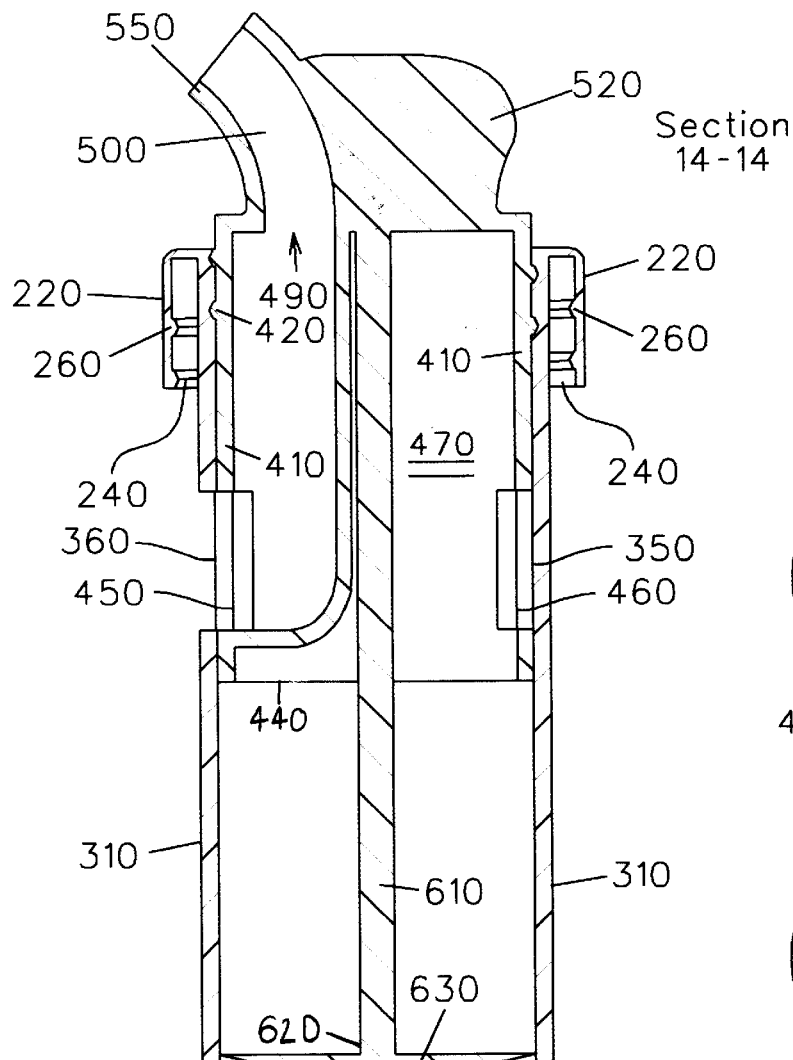
FIG. 14
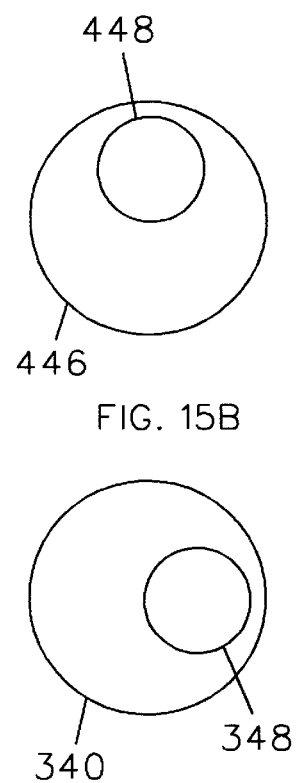
FIG. 15B
FIG. 15A

BEVERAGE STORAGE AND MIXING DEVICE

BACKGROUND OF THE INVENTION

This invention relates generally to beverage containers and, more particularly, to a drinking bottle for storing, mixing, and selectively dispensing at least two beverage substances.

Sports or drink bottles have significant advantages over prior disposable cups with lids and even over conventional beverage cans and bottles. A drinking bottle is typically constructed of resilient, flexible plastic material which is more durable than prior drink containers and thus may be used during recreational activities or while driving a vehicle. Drink bottles having spouts or straws with capped ends provide additional advantages for convenient use in various environments.

Although assumably effective in operation, such known devices are incapable of storing, mixing, and selectively dispensing more than a single beverage. Traditional drink bottles, therefore, limit the beverage choices of individuals not having the capacity to carry multiple beverage containers. For example, a runner capable of carrying a single bottle may desire water at one point in a race, but may desire a mixture rich in electrolytes and carbohydrates at a later time. Further, consumers may desire different flavors of fruit beverages at different times during an outing. Similarly, mixed drinks are sometimes consumed in sequence, such as beer followed by a tequila chaser.

Thus, it is desirable to have a drink bottle which can store at least two beverage substances either for sequential or mixed consumption by a user. It is also desirable to have a drink bottle which efficiently mixes the beverage substances when desired by a user.

SUMMARY OF THE INVENTION

In response thereto, I have invented a beverage storage and mixing device which utilizes a cap assembly attached to a conventional drink bottle, the cap assembly including nested inner and outer hollow cylindrical housings which cooperate to store and dispense beverage substances either sequentially or in combination. The inner housing is selectably rotatable within the cap assembly and outer housing whereas the outer housing is fixedly attached to the cap assembly. The inner housing includes a vertically extending channel for dispensing a beverage substance from the main drink bottle reservoir to a user, the channel having a spout attached to its upper end. The inner housing further includes a chamber for storing a second beverage substance, whether the substance is a liquid or a powdered concentrate.

Inner and outer housings present apertures through their respective side walls which selectably cooperate to dispense either a particular beverage substance or mixture to a user. More particularly, when the inner housing is rotated to align an aperture in communication with the inner housing channel with an aperture in the outer housing, the beverage substance contained within the main bottle/container reservoir may be dispensed to a user through the spout. A second beverage substance stored within the inner housing chamber is undisturbed in this instance.

The inner housing may be further rotated within the cap assembly such that apertures in the side walls of inner and outer housings become aligned. This causes a communication of the substance in the inner housing chamber with the bottle/container reservoir. In addition, the cap assembly is threaded such that rotation of the spout and thus the inner housing causes downward movement of the inner housing relative to the bottom wall of the outer housing. Accordingly, relatively sharp lower edges of the inner housing or a separate puncture device will rupture the bottom wall concurrently with alignment of the apertures in the side walls of the housings to facilitate further communication of the inner housing chamber with the bottle/container reservoir and an enhanced mixing of the two beverage substances. The mixed drink may then be dispensed to a user through the channel and spout in communication with the container.

Alternatively, the inner and outer housings may include bottom walls having apertures which may be rotatably aligned to communicate the inner housing with the bottle/container reservoir and facilitate the circulatory mixing of beverage substances as described above.

It is therefore a general object of this invention to provide a beverage storage and mixing device for selectably dispensing at least two beverages to a user.

Another object of this invention is to provide a beverage storage and mixing device, as aforesaid, which can selectably dispense stored beverages sequentially or in combination.

Yet another object of this invention is to provide a beverage storage and mixing device, as aforesaid, which is adaptable for use with a conventional drink bottle.

A further object of this invention is to provide a beverage storage and mixing device, as aforesaid, which can at a first position dispense a first beverage without mixing with a second beverage substances.

A still further object of this invention is to provide a beverage storage and mixing device, as aforesaid, which can efficiently mix at least two beverage substances at a second position.

Still another object of this invention is to provide a beverage storage and mixing device, as aforesaid, having a spout with a cap and seal which alert users relative to tampering.

Other objects and advantages of this invention will become apparent from the following description taken in connection with the accompanying drawings, wherein is set forth by way of illustration and example, embodiments of this invention.

BRIEF DESCRIPTION OF THE DRAWINGS

FIG. 9A is a rear view of the outer housing of FIG. 8A.

FIG. 9B is a rear view of the inner housing of FIG. 8B.

FIG. 10B is a top view of the inner housing of FIG. 8B.

FIG. 14 is a sectional view of the cap assembly of FIG. 13 taken along plane 14—14.

FIGS. 15a and 15b are diagrammatic views showing the bottom walls of the inner and outer housings and apertures therein for use in an alternative embodiment.

DESCRIPTION OF THE PREFERRED EMBODIMENT

Figure 1:
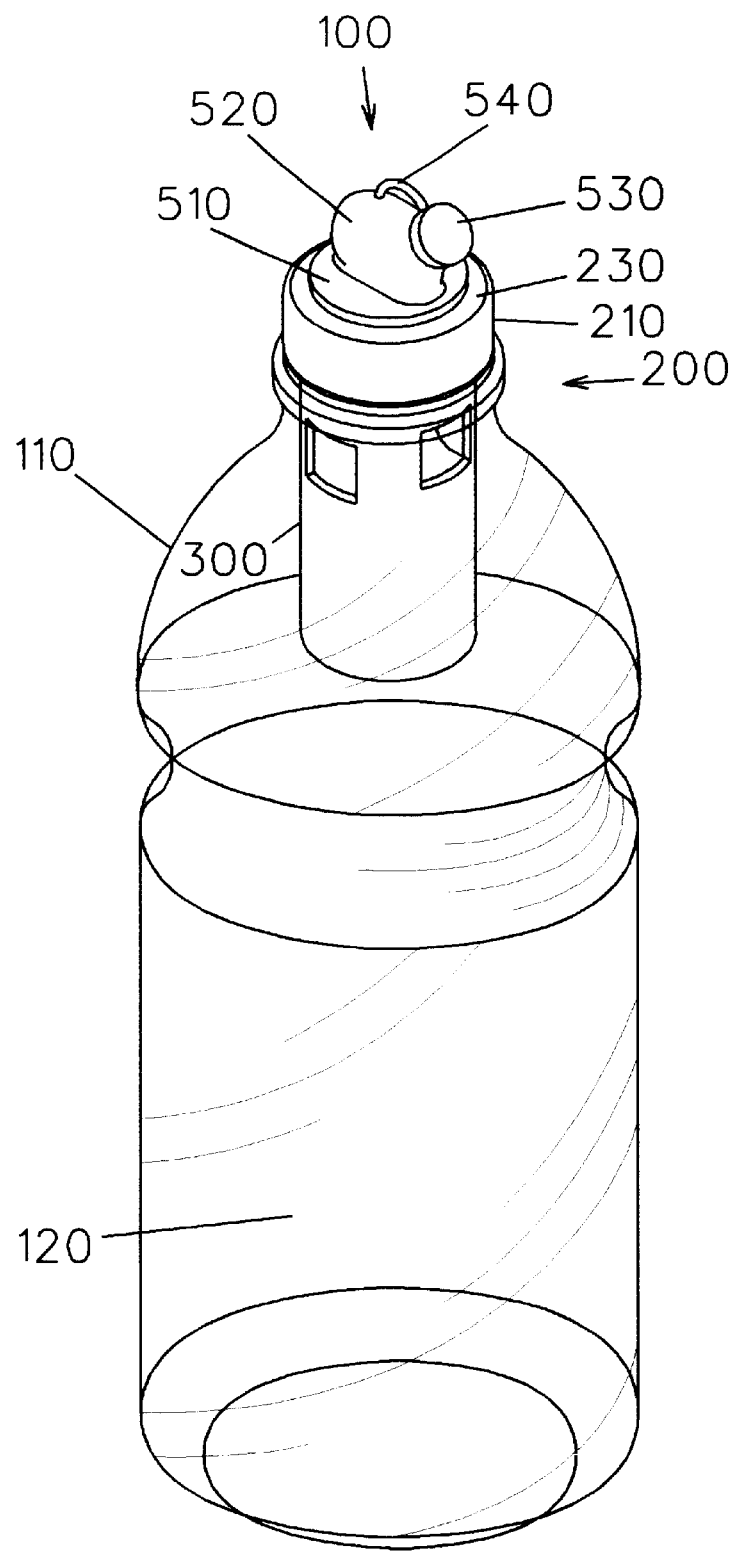
FIG. 1 is a perspective transparent view of the beverage storage and mixing device.

Turning more particularly to the drawings, FIG. 1 shows a first embodiment of the beverage storage and mixing device 100 comprising a cap assembly 200 screwably coupled to any conventional threaded spout of a drink or sports bottle 110. The drink bottle 110 is preferably constructed of a transparent, flexible, resilient plastic material which is durable for use in various environments and which allows a user to view the mixing of beverages contained therein. It is understood that the drink bottle 110 provides the primary reservoir 120 for a beverage, e.g. water, and may be repeatedly filled/refilled for use with cap assemblies 200 containing a variety of beverage substances according to the preference of a user. It is further understood, however, that the cap assembly 200 and bottle 110 may initially provide tamperproof seals which alert a user if the device has been previously used.

Figure 2:
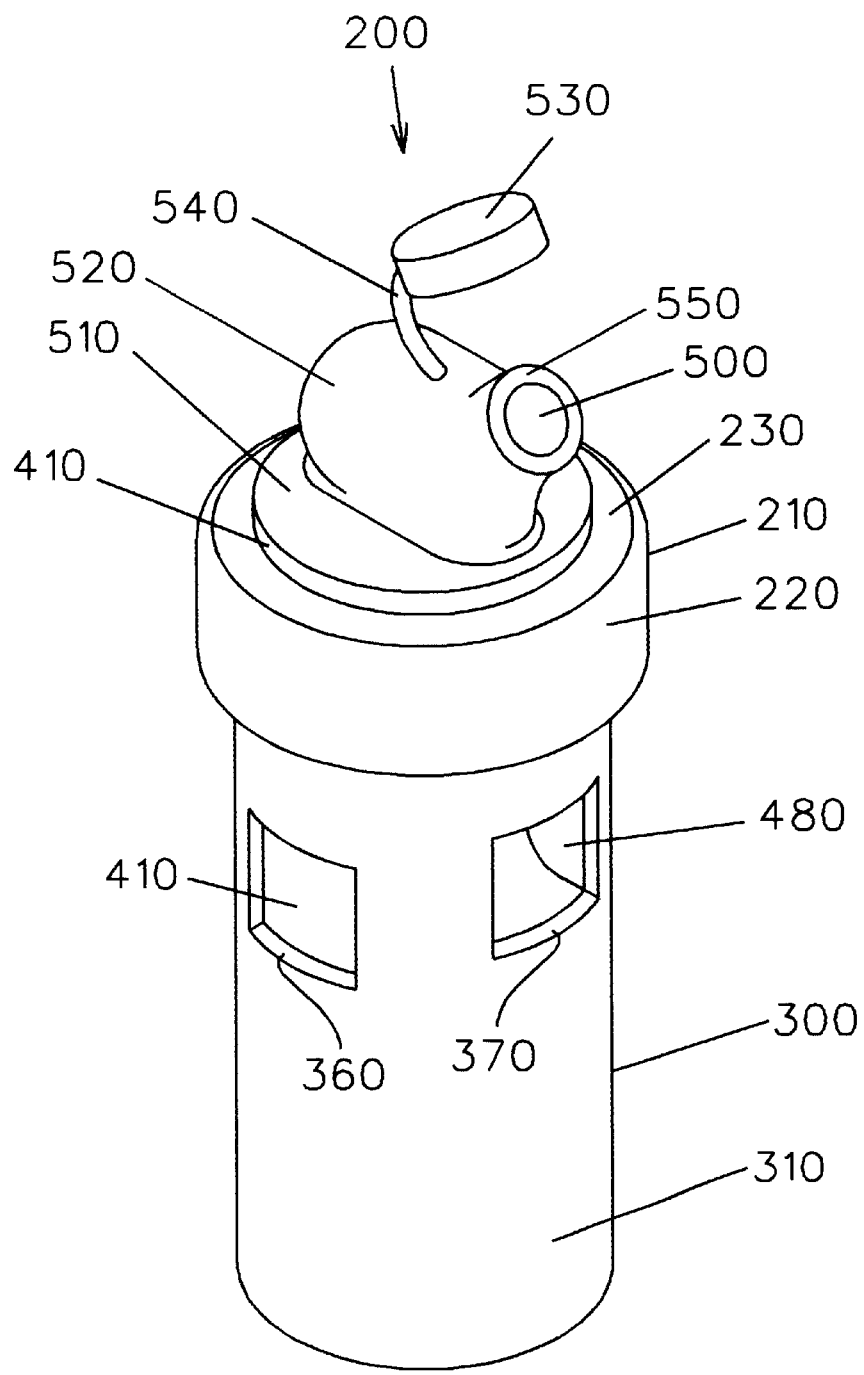
FIG. 2 is a perspective view of the cap assembly of the device shown in FIG. 1, on an enlarged scale, with the cap displaced from the spout and the spout and inner housing oriented to a first position.
Figures 8A, 8B:
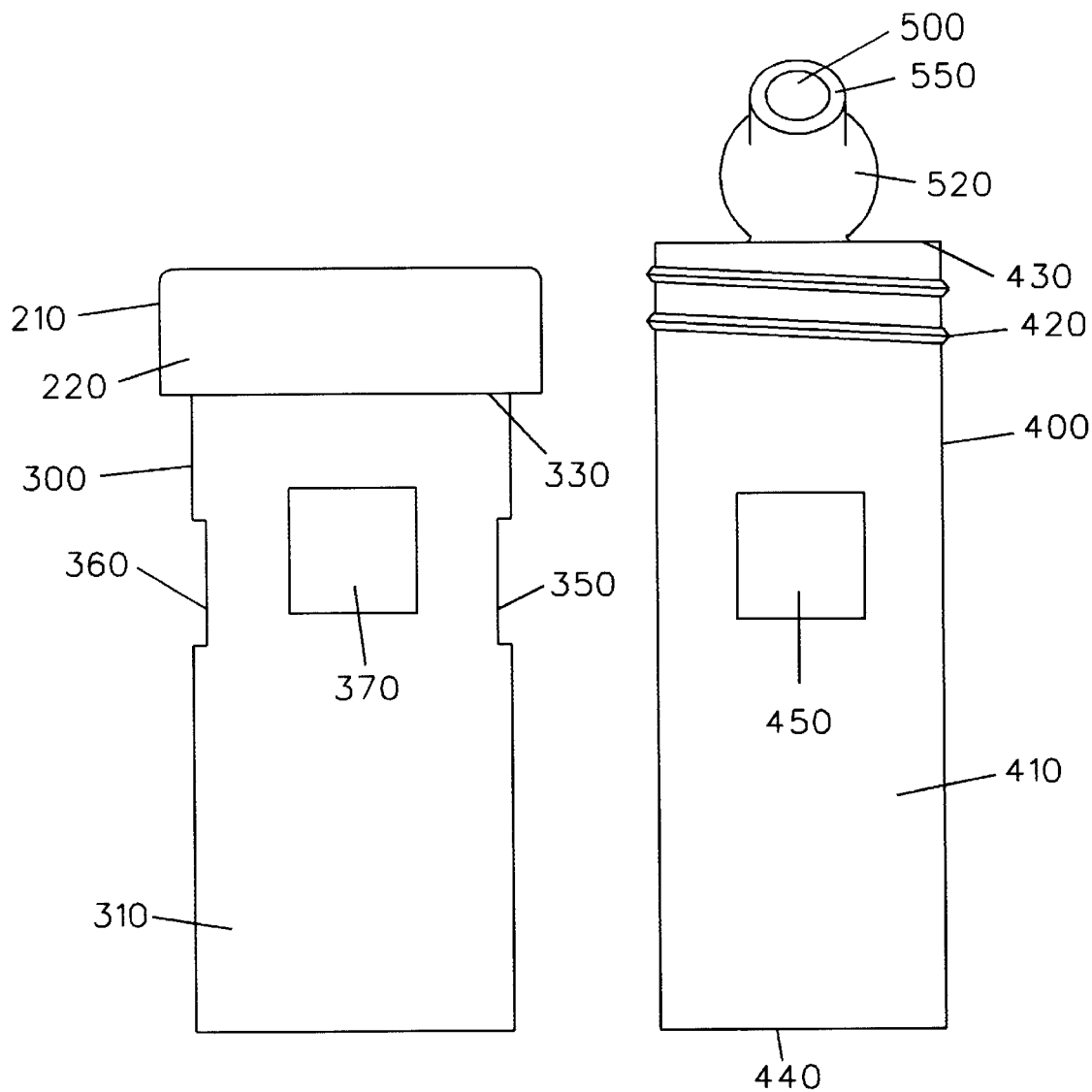
FIG. 8A is a front view of the outer housing of the cap assembly of FIG. 2.
FIG. 8B is a front view of the inner housing of the cap assembly of FIG. 2.
Figure 10A:
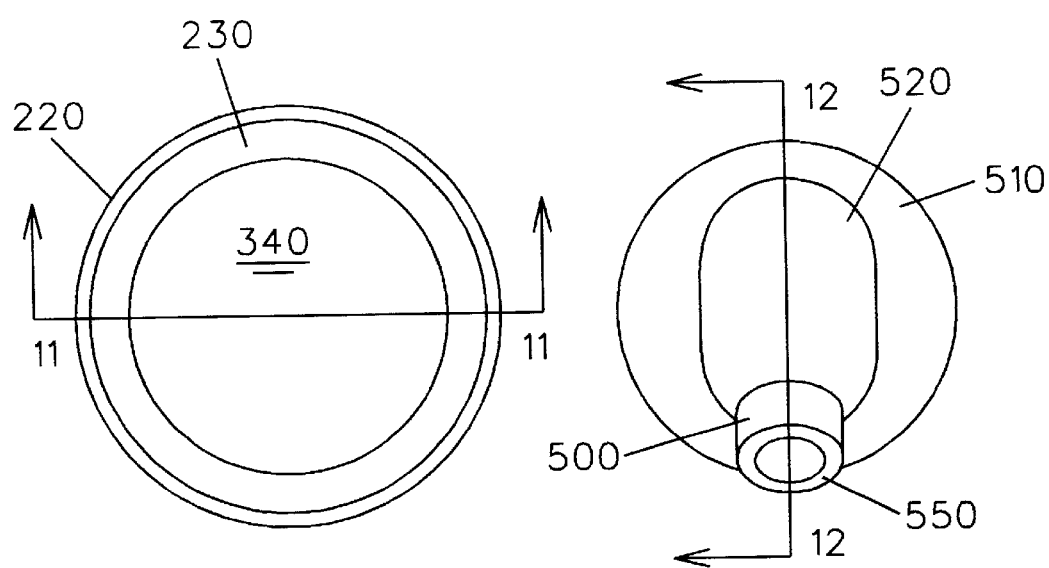
FIG. 10A is a top view of the outer housing of FIG. 8A.
Figure 11:
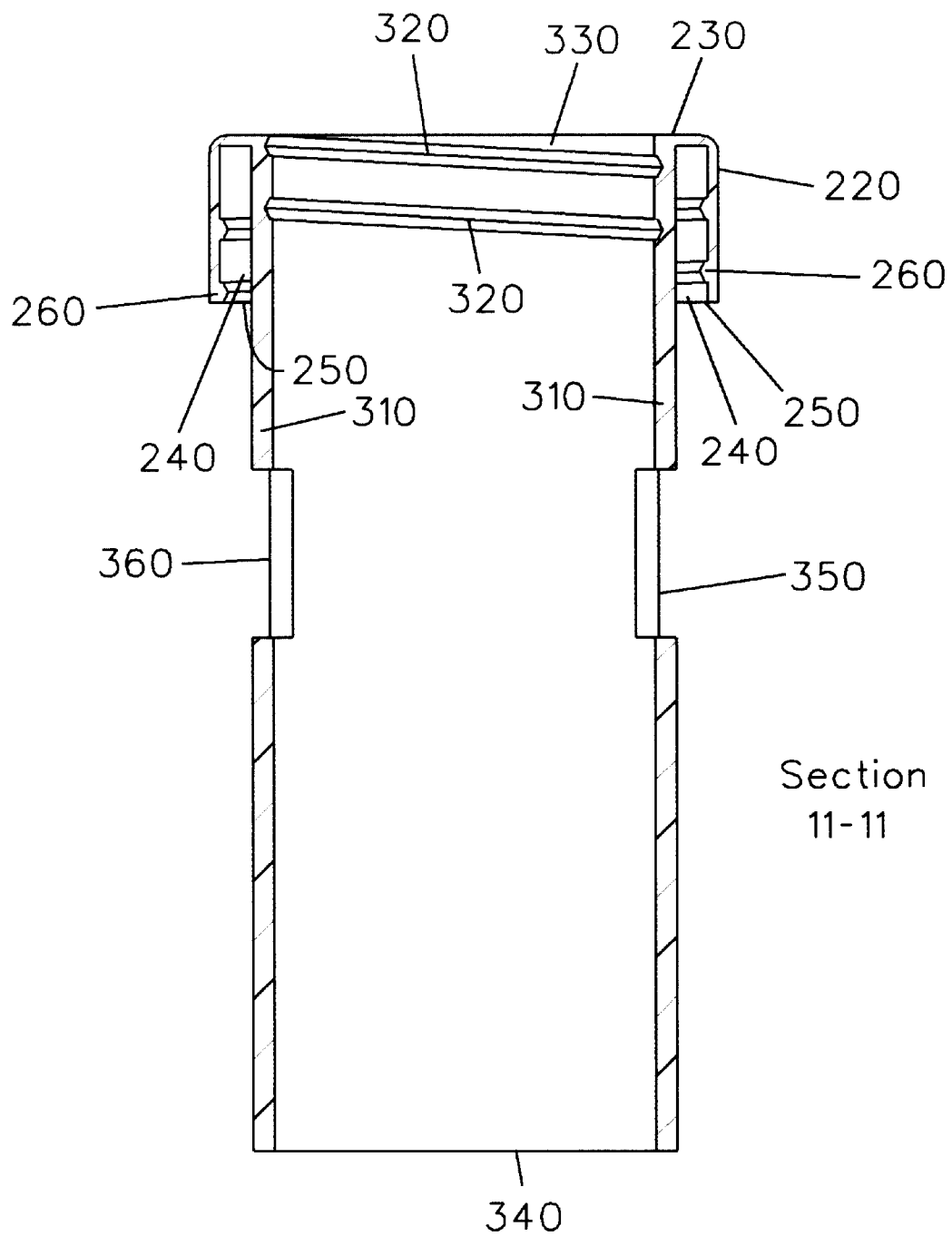
FIG. 11 is a sectional view of the outer housing of FIG. 10A taken along plane 11—11.

As more particularly shown in FIGS. 2, 8A and 8B, the cap assembly 200 comprises a cap 210 with outer and inner cylindrical housings 300, 400 attached thereto, the inner housing 400 being rotatably nested within the outer housing 300. The cap 210 includes an annular outer wall 220 integrally joined to a beveled annular upper rim 230, the rim 230 being integrally attached to the downwardly extending wall 310 of outer housing 300 (FIG. 11). An annular slot 240 having a downwardly open end 250 is presented between the outer cap wall 220 and outer wall 310 of the outer housing 300, the outer cap wall 220 being interiorly threaded 260 for screwable attachment to the complementary threads found about the spout of the bottle 110.

The outer housing 300 includes a downwardly extending cylindrical outer wall 310 having a bore vertically extending therethrough for receiving the inner housing 400 (FIG. 8B) therein, the outer wall 310 having interiorly disposed threads 320 at an upper end 330 thereof. These threads 320 (FIG. 11) engage the threads 420 about inner housing 400 which couple the housings 300, 400 and permit the inner housing 400 to rotate within housing 300 in relative movement therebetween. The outer housing 300 further includes a bottom wall 340 preferably made of a thin plastic material or membrane which will easily rupture when pressure from the lower free edge of the inner housing 400 is urged thereupon as to be further described later. The outer side wall 310 of the outer housing 300 presents oppositely disposed right side and left side apertures 350, 360 therethrough (FIG. 9A) which when properly aligned with apertures 450, 460 (FIG. 9B) in the inner housing 400 communicates the respective interiors of channel 490 and bore 470 with the bottle reservoir 120. A front medial aperture 370 is disposed an equal distance between apertures 350, 360 (FIG. 8A) and is slightly nearer the upper end 330 of the outer housing 300. The function and relation of said apertures 350, 360, 370 will be further described later. It is understood that while the apertures in the housings 300, 400 are of identical dimension, they are not otherwise constrained to any particular size or shape.

Figure 12:
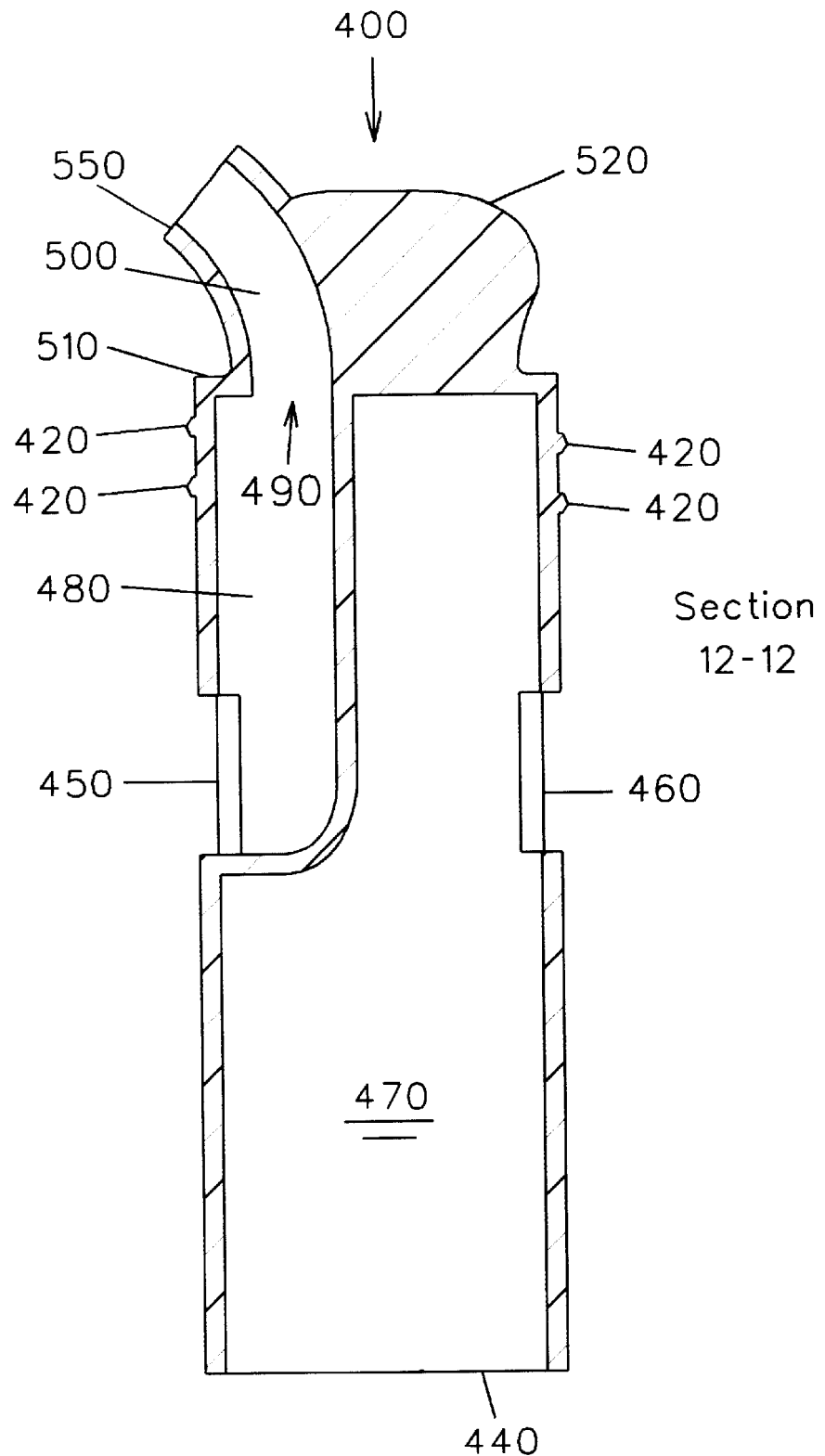
FIG. 12 is a sectional view of the inner housing of FIG. 10B taken along plane 12—12.

As shown in FIGS. 8B–10B and 12, the inner housing 400 includes a downwardly extending cylindrical outer wall 410 having a bore vertically extending therethrough. The outer wall 410 includes exteriorly disposed threads 420 substantially near an upper end 430 thereof which engage the interior threads 320 of the outer housing 300 (FIG. 11) and allow the inner housing 400 to screwably rotate therein. The outer wall 410 presents oppositely disposed front 450 (FIG. 8B) and rear 460 (FIG. 9B) apertures which, when properly aligned, selectably communicate with apertures 350, 360, 370 in the outer housing 300 and with the bottle reservoir 120. The inner housing 400 includes a bore 470 (FIG. 12) open at one end 440 thereof. Upon insertion of housing 400 within housing 300 the bore 470 cooperates with the bottom wall 340 to form a chamber 470 for storing a beverage substance therein. A beverage substance within chamber 470 is dispensed or mixed with the contents of the bottle reservoir 120 on proper alignment of the rear aperture 460 as described below. The inner housing 400 further includes a separate channel structure 480 in communication with the front aperture 450 in side wall 410 and vertically extending therefrom to an outlet aperture 490 through a top wall 510 of the housing 400 (FIG. 12). A spout 500 surrounds the outlet aperture 490 in the top wall 510 of housing and extends upwardly from this top wall 510 of the inner housing 400, the spout 500 providing a convenient receptacle which can be placed in a user's mouth for drawing a drink from the bottle reservoir 120. The spout 500 is integral with a flange 520 which may be easily grasped by a user to rotate the spout 500 and inner housing 400 within the outer housing 300. A cap 530 is fixedly attached to the flange 520 with a tether 540 and may be snappably secured to the upper outlet 550 of the spout 500 to avoid spillage of the beverage contained within the reservoir 120.

In function, the bottle 110 may be filled with any beverage desired by a user or may be filled and sealed at the time of manufacture. A cap assembly 200 containing a second beverage within chamber 470 is oriented to a first position and screwably secured to the bottle 110 by engagement of threads 260 on outer housing 300 with threads on the bottle 110 spout (FIG. 2). In a first position, the front aperture 450 of the inner housing 400 and consequently the channel 470 and spout 500 are aligned with the higher front aperture 370 of the outer housing 300, thereby allowing the bottle 110 beverage to be drawn from the reservoir 120 through the aligned apertures 370, 450 for entry into channel 480 and discharge from outlet aperture 490 and spout 500 by a user. As neither the lower right and left side apertures 350, 360 of the outer housing 300 are aligned with the rear aperture 460 of the inner housing 400 in the first position, the beverage substance contained within the chamber 470 (FIG. 12) is not released for mixture with the beverage in the bottle reservoir 120.

Figure 3:
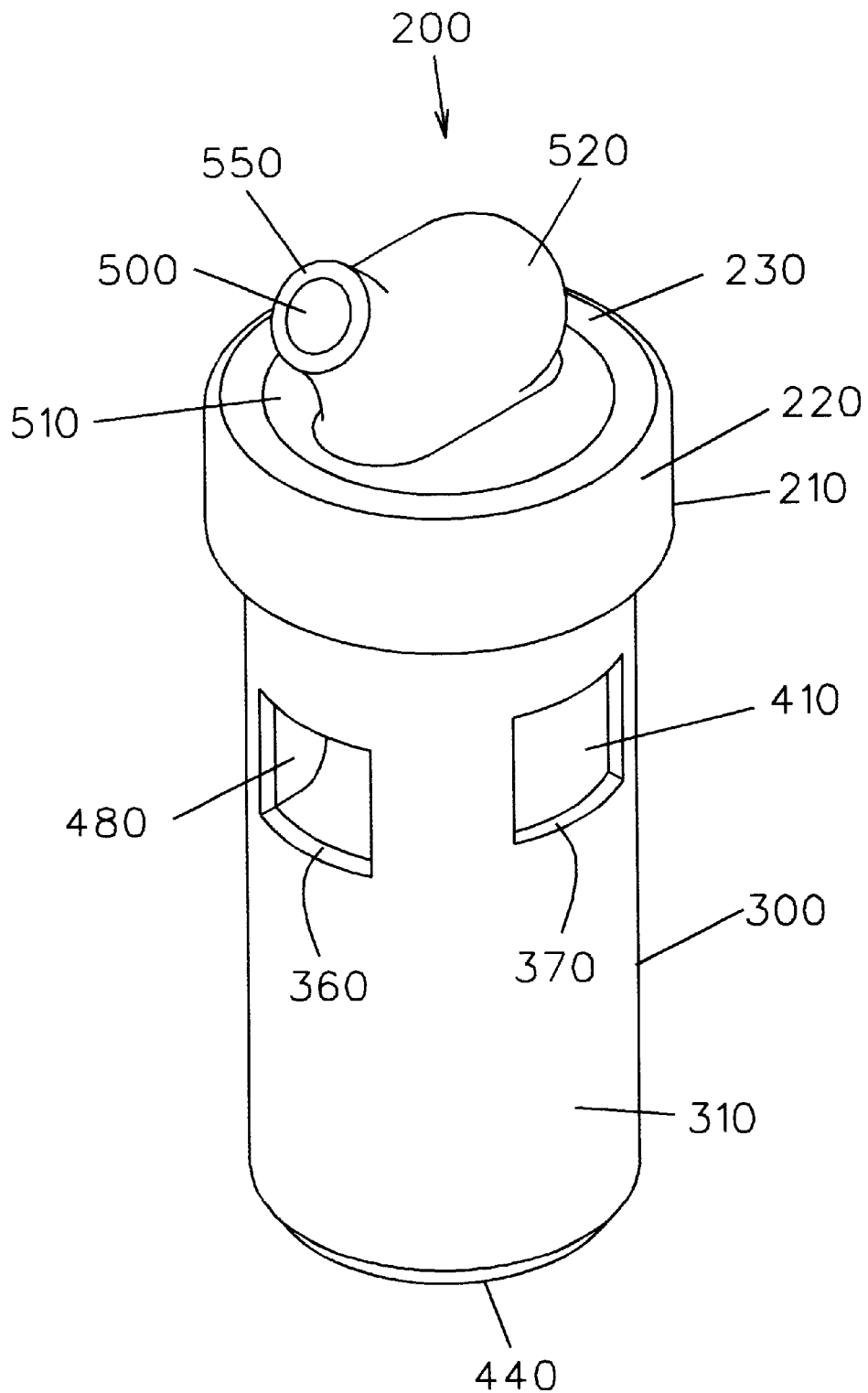
FIG. 3 is a perspective view of the cap assembly shown in FIG. 2 with the cap being removed from the assembly and the spout and inner housing rotated 90° clockwise.
Figure 4:
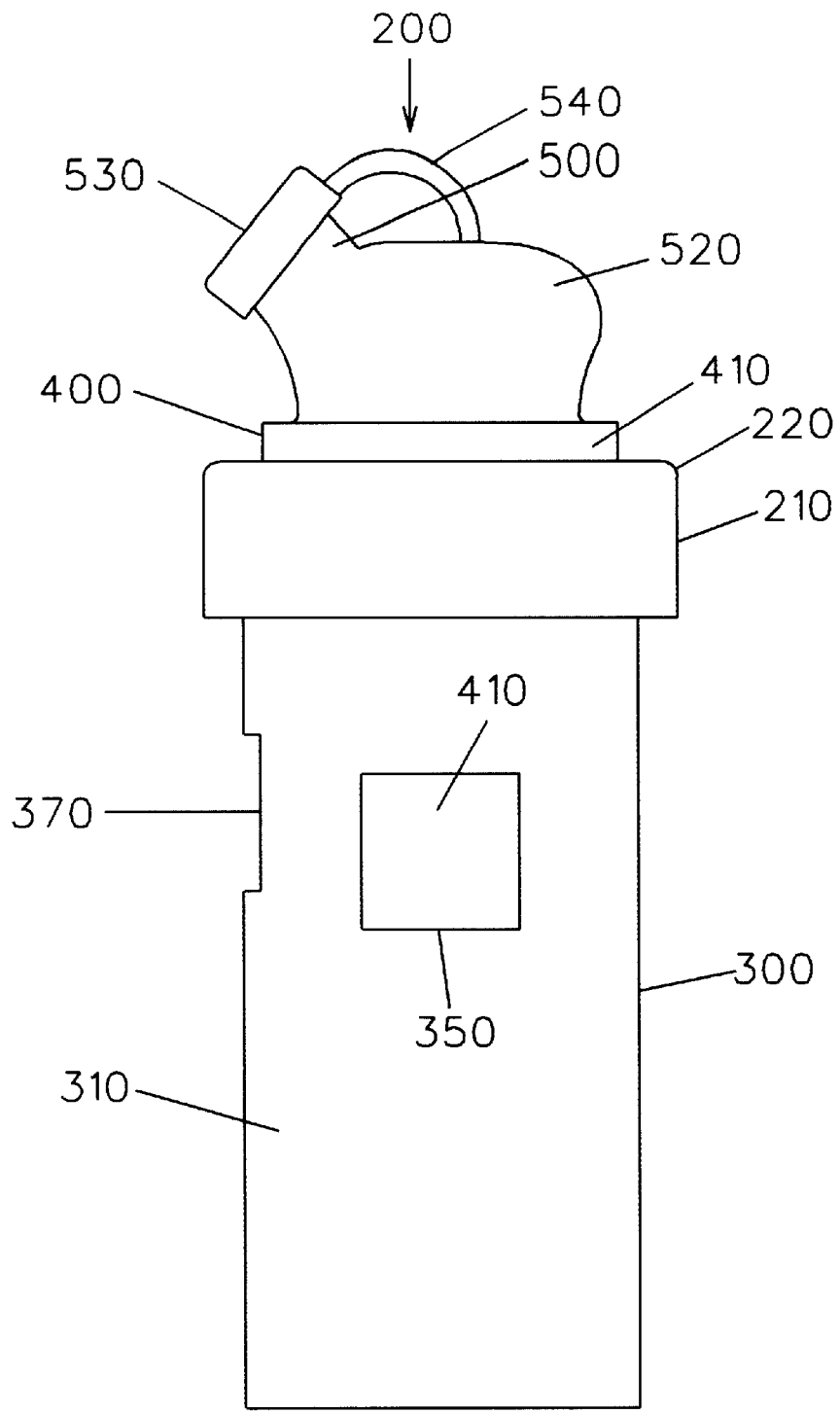
FIG. 4 is a right side view of the cap assembly of FIG. 2 with cap in place.
Figure 5:
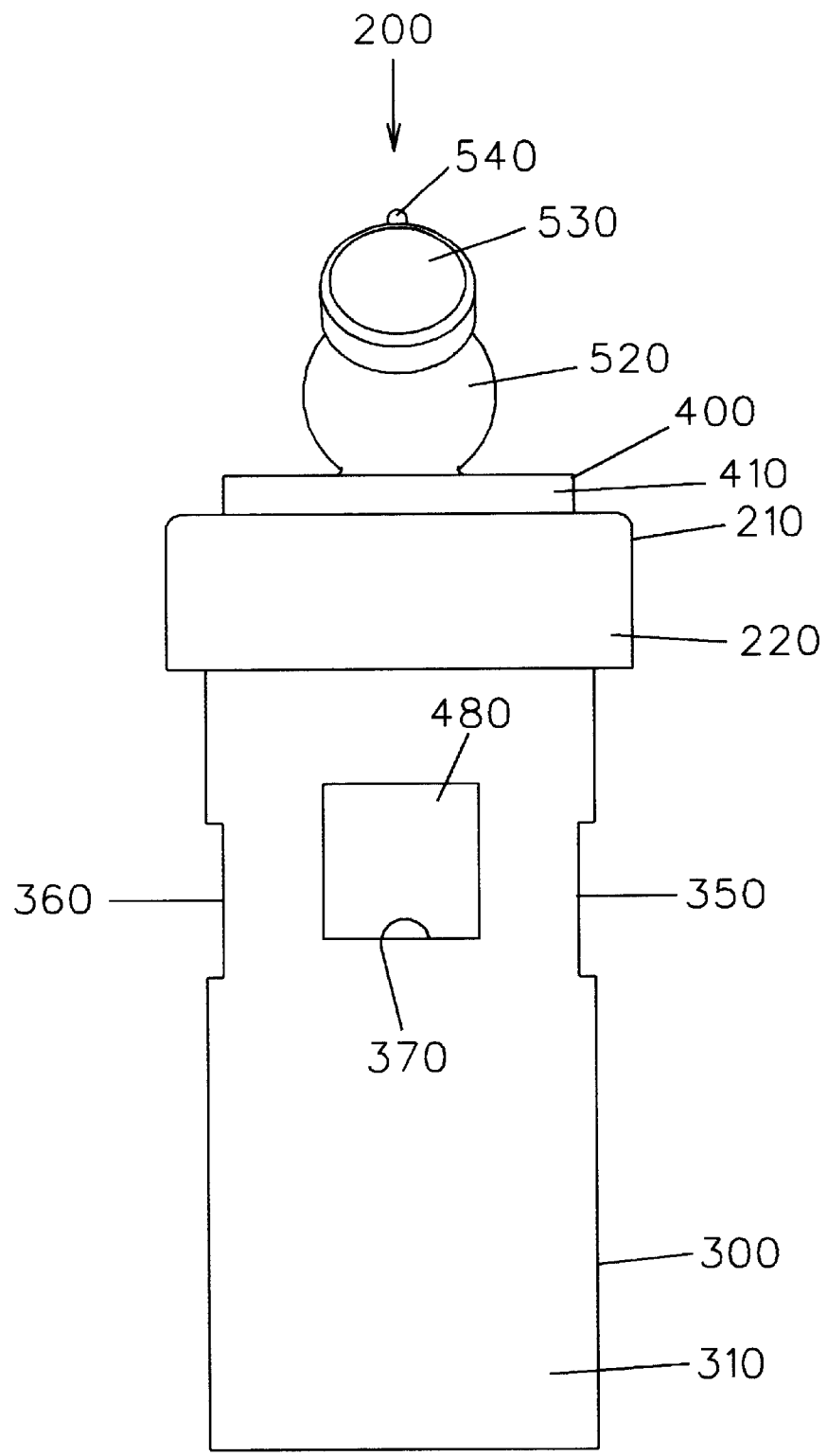
FIG. 5 is a front view of the cap assembly of FIG. 2 with cap in place.
Figure 6:
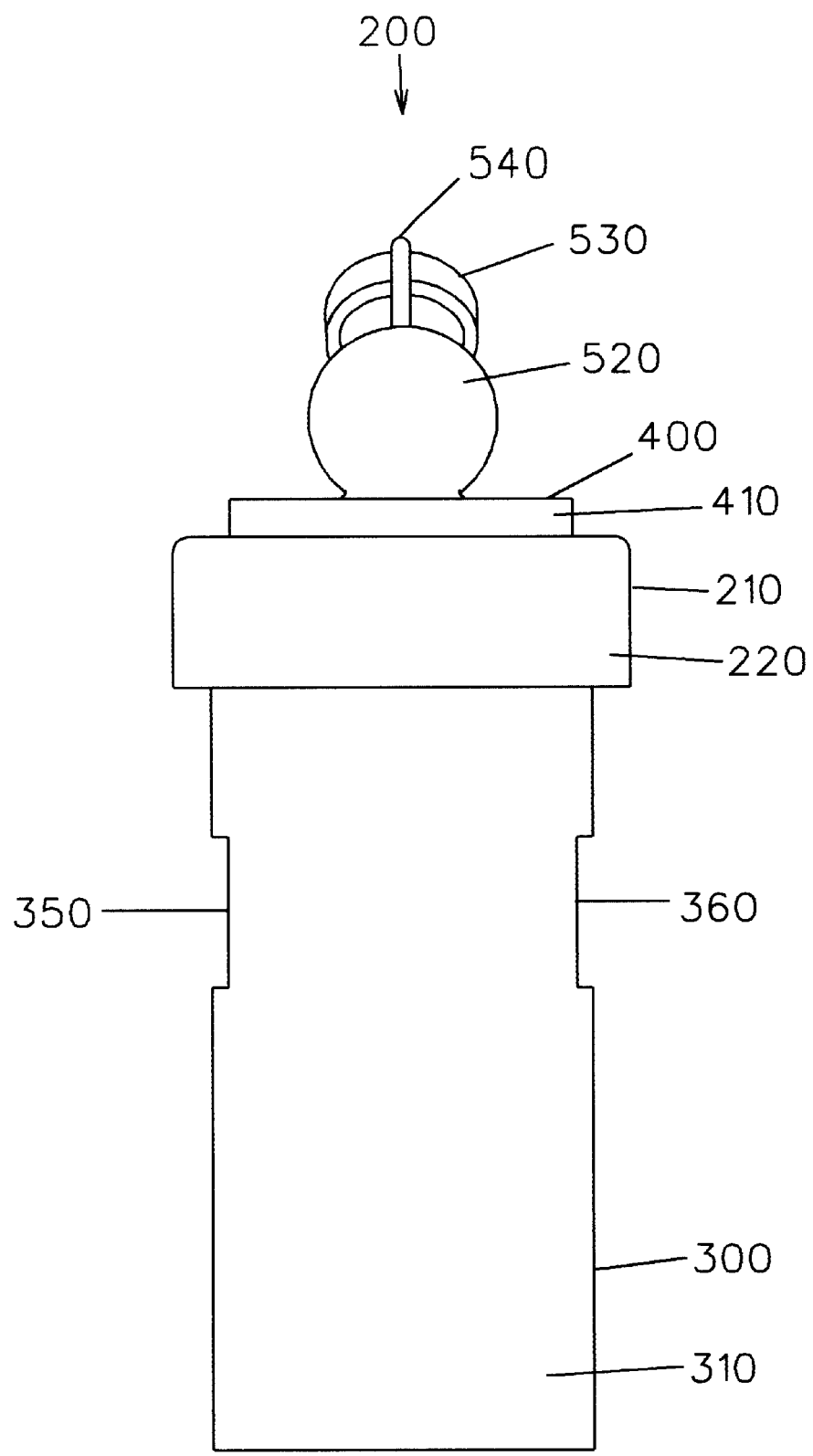
FIG. 6 is a rear view of the cap assembly of FIG. 5.
Figure 7:
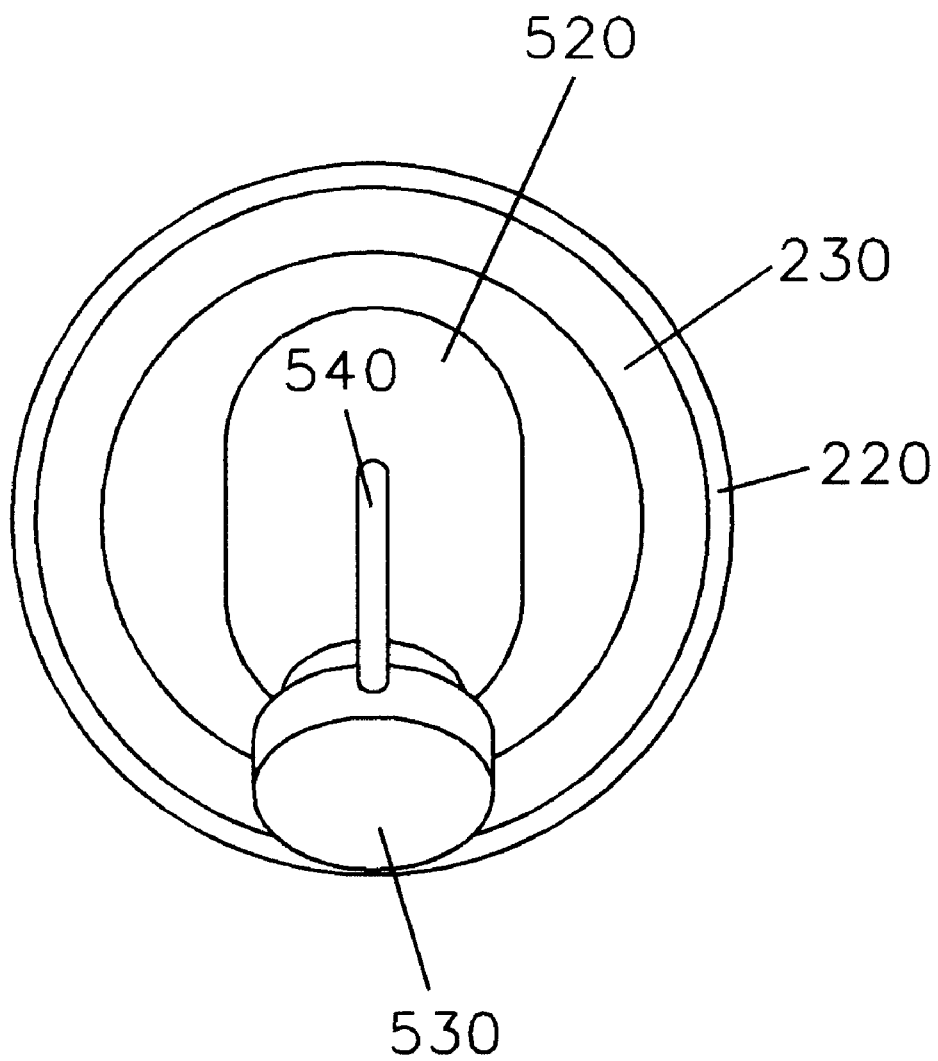
FIG. 7 is a top view of the cap assembly of FIG. 5.

A 90° clockwise rotation of the spout 500 and inner housing 400 attached thereto places the cap assembly 200 in a second position (FIG. 3). In the second position, the front aperture 450 of the inner housing 400 and consequently the channel 480 and spout 500 are aligned with the lower left side aperture 360 in the outer housing 300. Concurrently, the 90° rotation aligns the rear aperture 460 of the inner housing 400 with the right side aperture 350 of the outer housing 300, thus communicating channel 490 with the bottle reservoir 120 and the beverage substance in the chamber 470 with the bottle reservoir 120. It is understood that this clockwise rotation of the inner housing 400 causes downward movement thereof according to the threaded engagement of the housings 300, 400, thus ensuring proper vertical alignment of front and rear apertures 450, 460 of housing 400 with the lower left and right side apertures 360, 350 of housing 300, respectively. Clockwise rotation of the inner housing 400 within the outer housing 300 downwardly urges the lower free edges 440 of the outer wall 410 thereof beyond the bottom wall 340 of the outer housing 300, causing the bottom wall 340 to rupture (FIG. 3). Rupture of the bottom wall 340 of housing 300 allows the beverage substance contained within the chamber 470 to be further released into or interact with the bottle reservoir 120 for mixing with the beverage contained therein. The ruptured bottom wall 340 cooperates with aligned apertures 350, 460 to promote a vertical circulatory fluid flow path for enhancing the mixing of the beverage substance within chamber 470 with the beverage within bottle reservoir 120. The mixed beverage may then be drawn from the reservoir 120 through the aligned aperture 360 of housing 300 and aperture 450 of channel 480 via spout 500 by a user.

Figure 13:
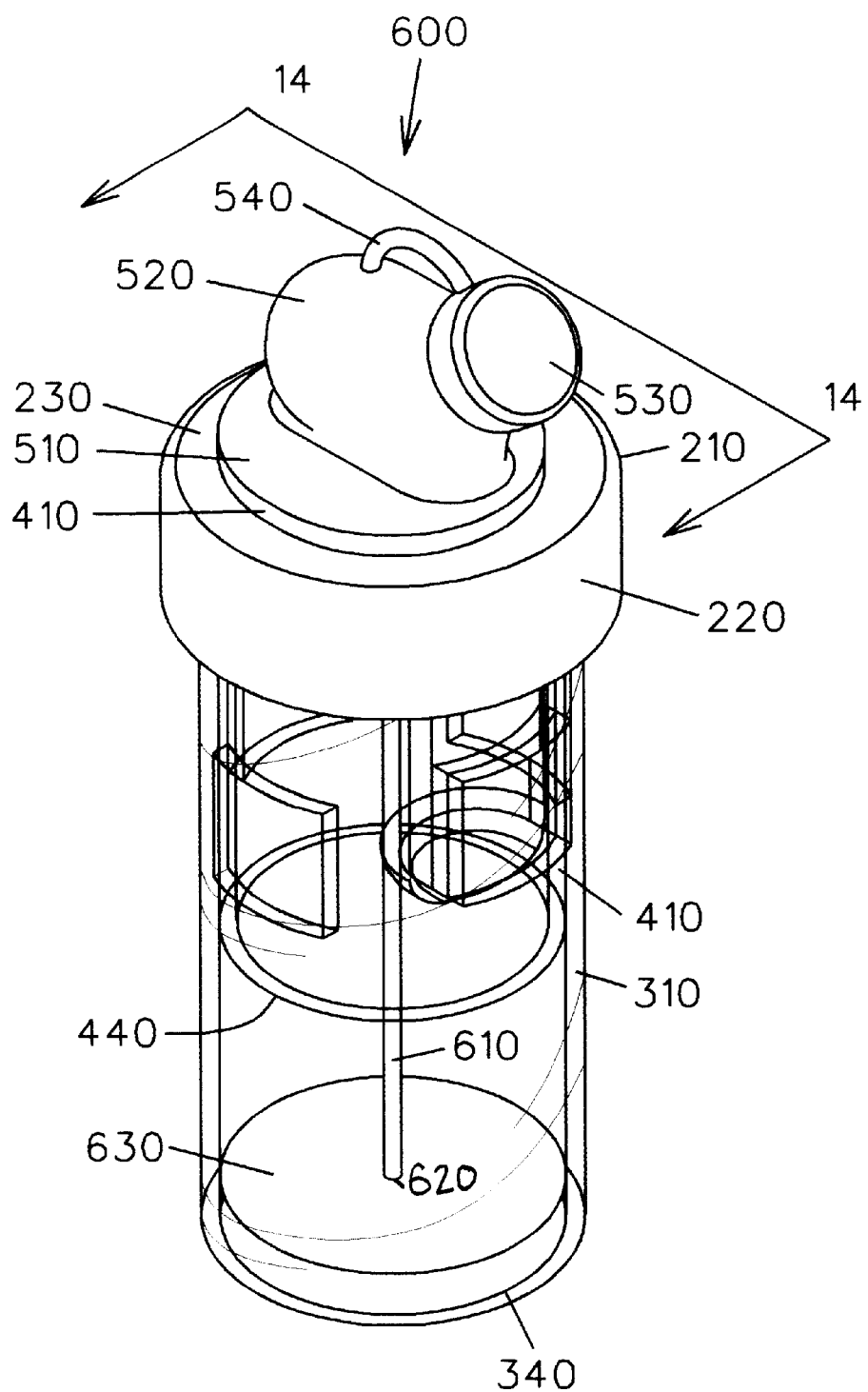
FIG. 13 is a perspective view of an alternative embodiment of the cap assembly showing a rod vertically extending through the inner housing.

An alternative embodiment 600 is shown in FIGS. 13 and 14 for rupturing the bottom wall 340 of the outer housing 300 such that the lower edges 440 of the inner housing 400 need not extend substantially beyond the bottom wall 340 of outer housing 300. Instead, a rod 610 is fixedly attached to the housing 520 and downwardly extends through the chamber 470 of the inner housing 400. The rod 610 has a pointed configuration 630 which punctures the bottom wall 340 during clockwise rotation of the inner housing 400 as described earlier.

In lieu of rupturing or puncturing the bottom wall 340 of housing 300 both first and inner housings may have bottom walls 340, 448 with apertures 348, 448 therein (FIG. 15). These apertures would be aligned concurrently with alignment of the housing 300, 400 apertures in the outer walls 310, 410 at the second position as described earlier for establishing a circulatory flow for efficient mixing of beverages. Rotation of the inner housing may be accomplished without downward movement thereof since physical rupture of the bottom wall 340 of a outer housing is unnecessary. Upon alignment of the apertures 348, 448 in the bottom walls the enhanced flow path will be established as above described.

Accordingly, it can be seen that the beverage storage and mixing device can store and selectively dispense at least two beverages in sequence or in combination to a user. The device further can efficiently mix beverages in a visually appealing manner.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A drinking device for attachment to a spout of a container adapted to hold a beverage therein comprising:
   a first housing;
   a bore extending through said first housing, said bore having an open end presented at a top of said first housing;
   a pair of apertures in said first housing and in communication with said bore;
   a medial aperture in said first housing and in communication with said bore;
   means for connecting said first housing to a spout of the container with said first housing depending into the container;
   a second housing configured for insertion in said bore of said first housing;
   a bore extending through said second housing having first and second opposed ends, an insertion of said second housing into said first housing causing said second housing bore to cooperate with said first housing to form a chamber in said second housing for containing a substance therein;
   a chamber aperture in said second housing and in communication with said chamber in said second housing;
   a channel in said second housing, said channel having first and second ends and presenting a channel aperture in said second housing at said channel first end and an outlet aperture in said second housing at said channel second end;
   means for coupling said second housing to said first housing in a relative movement of said second housing with said first housing between first and second positions, said first position aligning said channel aperture with said medial aperture in said first housing to communicate said channel with the container for flow of a beverage in the container through said channel and said channel outlet aperture, said second position aligning said channel aperture with one of said pair of apertures in said first housing and said chamber aperture with the other of said pair of apertures in said second housing, said alignment of said chamber aperture providing for a mixture of the beverage in the container with the substance in said chamber of said second housing and a flow path for said mixture through said other of said pair of first housing apertures and said channel aperture aligned therewith, whereby to dispense said mixture from said outlet aperture.

2. The device as claimed in claim 1 wherein said first housing comprises:
   a side wall surrounding said first housing bore;
   a bottom wall at an end of said first housing bore opposite said open end of said first bore.

3. The device as claimed in claim 2 wherein said connecting means comprises:
   a flange about said first housing side wall;
   a plurality of threads on said flange for engagement with a plurality of threads located on a spout of the container.

4. The device as claimed in claim 2 wherein said second housing comprises:
   a side wall surrounding said second housing bore;
   a top wall extending along said first end of said second housing bore with said second end of said second housing bore cooperating with said first housing bottom wall to form said chamber.

5. The device as claimed in claim 4 wherein said channel extends between said second housing side wall and said top wall of said second housing, said channel aperture in said side wall of said second housing and said outlet aperture in said top wall of said second housing.

6. The device as claimed in claim 1 wherein said coupling means comprises:

a plurality of threads about an interior of said first housing bore;

a plurality of complementary threads about an exterior of said second housing bore, an engagement of said respective threads of said first and second housings coupling said first housing to said second housing.

7. The device as claimed in claim 1 further comprising a flange extending from said second housing for manipulation by a user, said user manipulation moving said second housing between said first and second positions.

8. The device as claimed in claim 1 wherein said movement of said second housing to said second position extends said second housing beyond said first housing, said extension rupturing said first housing whereby the first beverage in the container communicates with the substance in said second housing chamber through said ruptured first housing.

9. The device as claimed in claim 1 further comprising:
puncture means on said second housing, said puncture means piercing said first housing upon movement of said second housing to said second position whereby to communicate said second housing chamber and substance therein with the container and beverage therein.

10. The device as claimed in claim 4 further comprising:
an aperture in said bottom wall of said first housing;
a bottom wall extending along said second end of said second housing bore and adjacent said bottom wall of said first housing bore;
an aperture in said bottom wall along said second housing bore, said second housing bottom wall cooperating with said top wall of said second housing bore to form said chamber, said apertures of said bottom walls out of alignment at said first position, said movement of said second housing to said second position aligning said apertures in said respective bottom walls whereby to communicate said second housing chamber and substance therein with the beverage in the container.

11. A drinking device for attachment to a spout of a container adapted to hold a beverage in an interior thereof comprising:
a first housing comprising:
a chamber within said first housing;
means on said first housing for attaching said first housing to a spout of a container, said attachment depends said first housing into an interior of the container;
first and second apertures in said first housing and in communication with said first housing chamber;
a third aperture in said first housing and in communication with said first housing chamber;
a second housing configured for insertion with said first housing chamber, said second housing comprising:
a compartment within said second housing and having an open end, said open end cooperating with said first housing to form a second housing chamber upon said insertion of said second housing within said first housing, said second housing chamber adapted to contain a second beverage substance therein;
a chamber aperture in said second housing and in communication with said second housing chamber;
a channel in said second housing presenting inlet and outlet apertures in said second housing;
means for providing a relative movement of said second housing within said first housing between first and second positions, said first position aligning said channel apertures of said second housing with said third aperture of said first housing to communicate said channel of said second housing with an interior of the container for providing a flow path for a beverage in the container through said channel;
said second position aligning said channel and chamber apertures of said second housing with said first and second apertures of said first housing, whereby said channel aperture alignment with said first aperture communicates the container with said channel and said alignment of said second housing chamber aperture communicates said chamber of said second housing with the container for mixture of substance in said second housing chamber with the beverage in the container, said mixture dispensed through said channel in communication with the container.

12. The device as claimed in claim 11 wherein said first housing comprises:
a side wall surrounding said first housing chamber;
a bottom wall at an end of said first housing chamber, said side wall presenting an opening to said first housing chamber at an end of said chamber opposite said bottom wall.

13. The device as claimed in claim 12 wherein said attaching means comprises:
a flange about said first housing side wall;
a plurality of threads on said flange for engagement with a plurality of threads located about a spout of the container.

14. The device as claimed in claim 12 wherein said second housing comprises:
a wall surrounding said second housing compartment;
a top wall extending along an end of said second housing compartment with said open end of said second housing compartment cooperating with said first housing bottom wall to form said chamber.

15. The device as claimed in claim 14 wherein said channel extends between said second housing wall and said top wall of said second housing, said channel aperture in said wall of said second housing and said outlet aperture in said top wall of said second housing.

16. The device as claimed in claim 11 wherein said relative movement means comprises:
a plurality of threads about an interior of said first housing chamber;
a plurality of complementary threads about an exterior of said second housing, an engagement of said respective threads of said first and second housings coupling said first housing to said second housing in said relative movement therebetween.

17. The device as claimed in claim 11 wherein said movement of said second housing to said second position extends said second housing beyond said first housing, said extension rupturing said first housing whereby the beverage in the container communicates with the substance in said second housing chamber through said ruptured first housing.

18. The device as claimed in claim 11 further comprising:
puncture means on said second housing, said puncture means piercing said first housing upon movement of said second housing to said second position whereby to communicate the substance in said second housing chamber with the beverage in the container.

19. A drinking device for attachment to a spout of a container adapted to hold a beverage therein comprising:
a first housing comprising:
a bottom wall;
a side wall extending from said bottom wall to present a bore surrounded by said side wall, said bore having a closed first end adjacent said bottom wall and an open second end adjacent a top of said side wall;

means about said side wall for attaching said first housing to a spout of a container, whereupon said attachment depends said first housing into the container;

first and second opposed apertures in said housing side wall and in communication with said bore;

a medial aperture positioned between said first and second apertures of said side wall and in communication with said bore;

a second housing configured for insertion with said first housing bore through said open end, said second housing comprising:

a side wall having a first end and a second end displaced therefrom;

a bore surrounded by said second housing side wall, said second end of said second housing side wall positioned adjacent said bottom wall of said first housing whereby to isolate said bore in said second housing from said bore in said first housing, said bore in said second housing adapted to hold a substance therein for mixture with a beverage in the container;

a top wall atop said side wall and closing said first end of said second housing bore;

a pair of opposing apertures in said side wall of said second housing, one of said apertures in communication with said second housing bore;

a channel in said second housing and isolated from said bore in said second housing, said channel having a first end in communication with the other of said pair of opposing apertures in said second housing, said channel having a second opposed end at said top wall of said second housing and presenting an outlet aperture therein;

means for providing movement of said second housing within said first housing between first and second positions, said first position aligning said one of said pair of opposing apertures of said second housing in communication with said channel with said medial aperture of said first housing to communicate said channel of said second housing with the container for providing a flow path for the beverage between the container and said channel outlet aperture;

said second position aligning said pair of apertures of said second housing in alignment with said first and second opposed apertures of said first housing, whereby said second housing aperture in communication with said channel is in alignment with one of said first or second apertures of said first housing to communicate the container with said channel, said other aperture of said second housing in communication with said second housing bore is aligned with the other of said first housing first or second apertures to communicate the second housing bore with the container for mixture of a substance in said second housing bore with the beverage in the bottle container, said mixture dispensed through said channel in said communication with the container.

20. The device as claimed in claim 19 further comprising means at said second end of said side wall of said second housing for piercing said first housing at said second position whereby to communicate said second housing bore and substance therein with the container and beverage therein.

* * * * *